US012671123B2

(12) United States Patent (10) Patent No.: US 12,671,123 B2
Dai et al. (45) Date of Patent: Jun. 30, 2026

(54) RECYCLING AND UPCYCLING OF NICKEL-BASED LITHIUM CATHODE MATERIALS

(71) Applicant: UT-Battelle, LLC, Oak Ridge, TN (US)

(72) Inventors: Sheng Dai, Knoxville, TN (US); Huimin Luo, Knoxville, TN (US); Bishnu P. Thapaliya, Knoxville, TN (US); Tao Wang, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 649 days.

(21) Appl. No.: 18/112,646

(22) Filed: Feb. 22, 2023

(65) Prior Publication Data

US 2023/0268574 A1 Aug. 24, 2023

Related U.S. Application Data

(60) Provisional application No. 63/312,863, filed on Feb. 23, 2022.

(51) Int. Cl.
  *H01M 4/00* (2006.01)
  *H01M 4/04* (2006.01)
  (Continued)

(52) U.S. Cl.
  CPC ......... *H01M 10/54* (2013.01); *H01M 4/0471* (2013.01); *H01M 4/525* (2013.01);
  (Continued)

(58) Field of Classification Search
  CPC ............. H01M 10/54; H01M 10/0525; H01M 4/0471; H01M 4/525; H01M 4/505; H01M 4/5825; Y02W 30/84
  See application file for complete search history.

(56) References Cited

U.S. PATENT DOCUMENTS

| | | | |
|---|---|---|---|
| 2022/0199966 A1* | 6/2022 | Chen ...................... | H01M 4/525 |
| 2022/0376240 A1 | 11/2022 | Luo et al. | |
| 2024/0079580 A1* | 3/2024 | Wang .................... | H01M 10/54 |

FOREIGN PATENT DOCUMENTS

| | | | | |
|---|---|---|---|---|
| CN | 112824327 A | * | 5/2021 | ............. C01G 53/82 |
| CN | 113265704 A | * | 8/2021 | ............. C30B 29/22 |

OTHER PUBLICATIONS

Merriam-webster (Year: 2021).*

(Continued)

*Primary Examiner* — Tiffany Legette
*Assistant Examiner* — Douglas C Marroquin
(74) *Attorney, Agent, or Firm* — Scully, Scott, Murphy & Presser, P.C.

(57) ABSTRACT

A method for processing spent nickel-based cathode material useful in lithium-based batteries, the method comprising: (i) producing an initial mixture containing the spent nickel-based cathode material and a molten salt system comprising cations and anions, wherein the cations comprise lithium cations; (ii) heating the initial mixture to a temperature of 700° C. to 900° C. for at least 1 hour to produce a relithiated cathode material; and (iii) washing the relithiated cathode material to remove any residual salt. In a further method, the cations comprise nickel and lithium cations and the anions comprise chloride or bromide anion in combination with at least one of nitrate, sulfate, and carbonate anions in further combination with hydroxide anion, wherein the method results in upcycling of the nickel-based cathode material to produce a version of said relithiated cathode material having a greater nickel content.

22 Claims, 6 Drawing Sheets

Reciprocal ternary molten salts (Li+, Na+//Cl-, NO3-)

Ni(OH)2

D-NCM 111

Up-NCM 811

(51) Int. Cl.
| | |
|---|---|
| *H01M 4/525* | (2010.01) |
| *H01M 4/58* | (2010.01) |
| *H01M 10/052* | (2010.01) |
| *H01M 10/54* | (2006.01) |
| *H01M 4/02* | (2006.01) |

(52) U.S. Cl.
CPC ........... *H01M 4/58* (2013.01); *H01M 10/052* (2013.01); *H01M 2004/021* (2013.01)

(56) References Cited

OTHER PUBLICATIONS

Materials Today, Han-xin et al., vol. 51, p. 365-392 (Year: 2021).*

Gaines et al., Direct Recycling R&D at the ReCell Center, MDPI, May 2021 (Year: 2021).*

Atia T A et al., "Closed-Loop Hydrometallurgical Treatment of End-of-Life Lithium Ion Batteries: Towards Zero-Waste Process and Metal Recycling in Advanced Batteries", Journal of Energy Chemistry 35:220-227 (2019).

Bai Y. et al., "Energy and Environment Aspects in Recycling Lithium-Ion Batteries: Concept of Battery Identify Global Passport", Materials Today 41:304-315 (Dec. 2020).

Beaudet A. et al., "Key Challenges and Opportunities for Recycling Electric Vehicle Battery Materials" Sustainability 12:5837 (2020).

Chen M. et al., "Recycling End-of-Life Electric Vehicle Lithium-Ion Batteries", Joule 3:2622-2646 (Nov. 20, 2019).

Ding Y. et al., "Automotive Li-Ion Batteries: Current Status and Future Perspectives", Electrochemical Energy Reviews 2:1-28 (Jan. 2019).

Duarte Castro F D et al., "Valorization of Resources from End-of-Life Lithium-Ion Batteries: a Review", Critical Reviews in Environmental Science and Technology 52(12):2060-2103 (2022).

Du K. et al., "Progresses in Sustainable Recycling Technology of Spent Lithium-Ion Batteries", Energy & Environmental Materials 5:1012-1036 (2022).

Fan M. et al., "Increased Residual Lithium Compounds Guided Design for Green Recycling of Spent Lithium-Ion Cathodes", Energy & Environmental Science 14:1461-1468 (2021).

Ganter M.J. et al., "Cathode Refunctionalization as a Lithium Battery Recycling Alternative", Journal of Power Sources 256:274-280 (2014).

Gao W. et al., "Lithium Carbonate Recovery form Cathode Scrap of Spent Lithium-Ion Battery: a Closed-Loop Process", Environmental Science & Technology 51:1662-1669 (2017).

Junxiong W. et al., "Sustainable Upcycling of Spent LiCoO2 to an Ultra-Stable Battery Cathode at High Voltage", Nature Sustainability 6(7):797-805 (Mar. 2023).

Kim U-H et al., "High Energy W-Doped Li[Ni0.95Co0.04Al0.01]O2 Cathodes for Next-Generation Electric Vehicles", Energy Storage Materials 33:399-407 (2020).

Lathika Divya M. et al., "Highly Reversible Na-Intercalation into Graphite Recovered from Spent Li-Ion Batteries for High-Energy Na-Ion Capacitor", ChemSusChem 13:5654-5663 (2020).

Li J. et al., "Water-Based Electrode Manufacturing and Direct Recycling of Lithium-Ion Battery Electrodes—a Green and Sustainable Manufacturing System", iScience 23:101081 (May 22, 2020).

Li M. et al., "30 Years of Lithium-Ion Batteries", Advanced Materials 30:1800561 (2018).

Li L. et al., "The Recycling of Spent Lithium-Ion Batteries: a Review of Current Processes and Technologies", Electrochemical Energy Reviews doi.org/10.1007/s41918-018-0012-1 (Sep. 2018).

Li L. et al., "Topochemical Molten Salt Synthesis for Functional Perovskite Compounds", Chemical Science 7:855-865 (2016).

Liang H-J et al., "Staging Na/K-Ion De-/Intercalation of Graphite Retrieved from Spent Li-Ion Batteries: in Operando X-Ray Diffraction Studies and an Advanced Anode Material for Na/K-Ion Batteries", Energy Environ. Sci. 12:3575-3584 (2019).

Mansur M B et al., "An Overview on the Recovery of Cobalt from End-of-Life Lithium Ion Batteries", Mineral Processing and Extractive Metallurgy Review 43(4):489-509 (2022).

Manthiram A. et al., "A Reflection on Lithium-Ion Battery Cathode Chemistry", Nature Communications 11(1550) (2020).

Manthiram A., "An Outlook on Lithium Ion Battery Technology", ACS Central Science 3:1063-1069 (2017).

Meng Y-F et al., "Concurrent Recycling Chemistry for Cathode/Anode in Spent Graphite LiFePO4 Batteries: Designing a Unique Cation/Anion-Co-Workable Dual-Ion Battery", Journal of Energy Chemistry 64:166-171 (2022).

Mesnier A. et al., "Synthesis of LiNiO2 at Moderate Oxygen Pressure and Long-Term Cyclability in Lithium-Ion Full Cells", ACS Applied Materials & Interfaces 12:52826-52835 (2020).

Mizushima K. et al., "LixCoO2 (O<x<1): a New Cathode Material for Batteries of High Energy Density", Mat. Res. Bull. 15(6):783-789 (1980).

Mossali E. et al., "Lithium-Ion Batteries Towards Circular Economy: a Literature Review of Opportunities and Issues of Recycling Treatments", Journal of Environmental Management 264:110500 (2020).

Noh H-J et al., "Comparison of the Structural and Electrochemical Properties of Layered Li[NixCoyMnz]O2 (x=⅓, 0.5, 0.6, 0.7, 0.8 and 0.85) Cathode Material for Lithium-Ion Batteries", Journal of Power Sources 233:121-130 (2013).

Olivetti E.A. et al., "Lithium-Ion Battery Supply Chain Considerations: Analysis of Potential Bottlenecks in Critical Metals", Joule 1:229-243 (Oct. 2017).

Robinson D., "Supply Chain Bottleneck Strangling Scale-Up of Lithium-Ion Battery Production for EVs", NS Energy (6 pages) (Mar. 4, 2020).

Roper W., "High Demand for Lithium-Ion Batteries", https://www.statista.com/chart/23808/lithium-ion-batter-demand (7 pages) (Dec. 18, 2020).

Ruiz Onofre P.N., "Evaluation of Pyrochemistry in Molten Salts for Recycling Li-Ion Batteries", Chemical Physics, Sorbonne Universite (161 pages (2019).

Shi Y. et al., "Ambient-Pressure Relithiation of Degraded LixNi0.5Co0.2Mn0.3O2 (0<x<1) via Eutectic Solutions for Direct Regeneration of Lithium-Ion Battery Cathodes", Advanced Energy Materials 9:1900454 (2019).

Sloop S.E. et al., "Advances in Direct Recycling of Lithium-Ion Electrode Materials", ECS Transactions 85 (13):397-403 (2018).

Velazquez-Martinez O. et al., "A Critical Review of Lithium-Ion Battery Recycling Processes from a Circular Economy Perspective", Batteries 5(68):1-33 (2019).

Wang T. et al., "Direct Recycling of Spent NCM Cathodes Through Lonothermal Lithiation", Advanced Energy Materials 10:2001204 (2020).

Xu P. et al., "Efficient Direct Recycling of Lithium-Ion Battery Cathodes by Targeted Healing", Joule 4:2609-2626 (Dec. 16, 2020).

Yang T. et al., "An Effective Relithiation Process for Recycling Lithium-Ion Battery Cathode Materials", Advanced Sustainable Systems 4:1900088 (2020).

Yoon C.S. et al., "Review-High-Capacity Li[Ni1-xCox/2Mnx/2]O2 (x=0.1, 0.05, 0) Cathodes for Next-Generation Li-Ion Battery", Journal of the Electrochemical Society 161(14):A2483-A2489 (2015).

Yoshino A., "The Birth of the Lithium-Ion Battery", Angew. Chem. Int. Ed. 51:5798-5800 (2012).

Yuan Y. et al., "Efficient Nanostructuring of Silicon by Electrochemical Alloying/Dealloying in Molten Salts for Improved Lithium Storage", Angew. Chem. Int. Ed. 57:15743-15748 (2018).

Zhang X. et al., "Toward Sustainable and Systematic Recycling of Spent Rechargeable Batteries", Chem. Soc. Rev. 47:7239-7302 (2018).

Zhang L. et al., "Remaining Useful Life Prediction for Lithium-Ion Batteries Based on Exponential Model and Particle Filter", 6:17729-17740 (2018).

Unknown, "The Global X Lithium & Battery Tech ETF Seeks to Provide Investment Results that Correspond Generally to the Price

(56) References Cited

OTHER PUBLICATIONS and Yield Performance, Before Fees and Expenses, of the Solactive
Global Lithium Index", Lithium & Battery Tech ETF (3 pages)
(2023).

\* cited by examiner

RECYCLING AND UPCYCLING OF NICKEL-BASED LITHIUM CATHODE MATERIALS

CROSS REFERENCE TO RELATED APPLICATION

The present application claims benefit of U.S. Provisional Application No. 63/312,863, filed on Feb. 23, 2022, all of the contents of which are incorporated herein by reference.

GOVERNMENT SUPPORT

This invention was made with government support under Prime Contract No. DE-AC05-000R22725 awarded by the U.S. Department of Energy. The government has certain rights in the invention.

FIELD OF THE INVENTION

The present invention generally relates to methods for recycling cathode material from lithium-based batteries, and more particularly, to methods in which delithiated cathode material is relithiated.

BACKGROUND

Lithium-ion batteries (LIBs) with high energy density make a significant contribution to solving energy storage issues but are at the same time environmentally unfriendly due to their hazardous materials, such as carcinogenic heavy metals and toxic electrolytes. With the rapidly increasing use of LIBs in our highly electrified society, proper handling of end-of-life (EOL) LIBs has become an urgent task. Efforts are ongoing to recycle highly valuable cathode materials, such as lithium metal oxides (M. Chen et al., *Joule*, 3, 2622, 2019). Current recycling technologies for cathode materials include pyrometallurgy based on a high-temperature smelting process, hydrometallurgy using aqueous chemistry, and direct recycling or upcycling active materials retaining their original compound structure. Although pyrometallurgy and hydrometallurgy can return valuable metals, such as Li, Co, and Ni, into the LIB production chain, the complete destruction of cathode particles reduces the highly added value of the compound structure. In contrast, the goal of direct recycling technology is to non-destructively mend the compositional and structural defects of degraded Li-deficient cathode particles in EOL LIBs.

As for the most popular cathode materials, NCM ($LiNi_xCo_yMn_zO_2$, $0<x,y,z<1$, $x+y+z=1$), the irreversible structural change resulting from Li loss is the main process occurring in cathode capacity degradation (I. Belharouak et al., *J. Power Sources*, 123, 247, 2003). Although a relithiation process can directly recycle spent NCM particles to achieve pristine structure and stoichiometry, the conventional processes generally require harsh conditions, such as high temperature and/or high pressure. Beyond direct recycling of spent cathodes to their pristine states, direct upcycling of spent cathodes (by addition of nickel) to next-generation cathodes is critical for maximizing the value of spent materials and to catch up with the fast development of LIBs. The upcycling of spent NCM 111 to Ni-rich NMC (e.g., NCM 622 and NCM 811) is a particular challenge because, unlike the slight weight change during the direct relithiation process, a significant weight change of NMC will happen during the upcycling process. For example, the upcycling of NMC 111 to NMC 622 will almost double the weight of NMC 111, from the insertion of Li, Ni, and O, which requires a high temperature above 600° C. to construct the $\alpha$-$NaFeO_2$ type layered structure. Thus, there would be a significant benefit in a more efficient and less costly method for the direct recycling and upcycling of lithium battery cathodes that employs relatively mild conditions and is scalable and environmentally friendly.

SUMMARY

The present disclosure is foremost directed to a relatively mild, straight-forward, and environmentally friendly method for recycling (i.e., relithiating) or upcycling nickel-based cathode material from spent (end-of-life) lithium-based batteries. The method of processing (i.e., recycling or upcycling) spent nickel-based cathode material includes at least the following steps: (i) producing an initial mixture containing the spent nickel-based cathode material and a molten salt system comprising cations and anions, wherein the cations are composed of at least lithium cations; (ii) heating the initial mixture to a temperature of 700° C. to 900° C. for at least 1 hour to promote lithium cation incorporation from the molten salt into the spent cathode material, thereby resulting in a relithiated cathode material; and (iii) washing the relithiated cathode material to remove any residual salt from the molten salt system. A recycling (strictly relithiation) method will generally employ a lithium salt without a nickel salt in the molten salt system. An upcycling method further includes a nickel salt in the molten salt. Thus, both recycling and upcycling processes involve relithiation. When the method is directed to upcycling, the cations include at least nickel and lithium cations and the anions preferably include at least chloride or bromide anion in combination with at least one of nitrate, sulfate, and carbonate anions in further combination with hydroxide anion, wherein the method results in upcycling of the nickel-based cathode material to produce a version of the relithiated cathode material having a greater nickel content. For example, NMC 111 cathode material may be upcycled to NMC 622 or NMC 811 cathode material.

An oxygen-rich environment is essential for the complete oxidation of inserted $Ni^{2+}$ to $Ni^{3+}$, to minimize lattice oxygen vacancies and Li/Ni antisite defects in Ni-rich NMC. The reversible reaction: $NaNO_3+LiCl \leftrightarrows LiNO_3+NaCl$ in the $Li^+$, $Na^+ \| Cl^-$, $NO3^-$ molten salt (MS) system permits a low eutectic melting point for the effective flux process under 300° C. Although nitrates will totally decompose above 600° C., the residual LiCl/NaCl can still provide a flux media for the formation of layered NMC structure under even higher temperature. Thus, in exemplary embodiments, a $Li^+$, $Na+ \| Cl^-$, $NO_3^-$ MS system that can work in a wide temperature range and provide an oxygen-rich environment is provided here for the upcycling of spent cathodes, such as NMC 111, to Ni-rich NMC (FIG. 1). In this upcycling strategy, cost-effective lithium chloride and nickel nitrate may be selected as Li and Ni sources, respectively. Sodium hydroxide (NaOH), among other possible metal hydroxides, may be used to react with nickel nitrate to obtain a nickel hydroxide precursor and sodium nitrate for the MS. As further discussed in the Examples section, after flux upcycling, the obtained Ni-rich NMC products (named as Up-NMC 622 based on its chemical composition) exhibited a pure $\alpha$-$NaFeO_2$ type layered structure, restored Li content, and excellent electrochemical performance, which is almost the same as the pristine NMC 622. The successful upcycling of spent NMC 111 provides a novel flux method to achieve the direct upcycling of spent LIB cathodes to the next-generation cathodes.

After MS flux upcycling, the recovered upcycled samples were characterized with TGA, XRD, SEM, and ICP-OES. The electrochemical performance for these relithiated samples were also evaluated in both half-cell and full-cell configuration giving excellent results. The obtained Ni-rich NMC products exhibited pure $\alpha$-NaFeO$_2$ type layered structure, restored Li content, and excellent electrochemical performance, which is almost the same as the pristine NMC 622 (P-NMC622). D-NMC 111 can also be upcycled to NMC 811 by the presently described MS flux method.

BRIEF DESCRIPTION OF THE DRAWINGS

FIGS. 2A-2D show XRD patterns for D-NMC 111, NMC 811, and Up-NMC 811. FIG. 2E is a graph showing Li molar ratio of D-NMC 111, NMC 811 and Up-NMC 811 based on ICP results. FIG. 2F shows TGA curves of D-NMC 111, P-NMC 811 and Up-NMC 811.

FIGS. 4A-4C are SEM images of P-NMC 811 at increasing magnification. FIGS. 4D-4F are SEM images of Up-NMC 811. FIG. 4G shows SEM-EDS elemental mappings of Up-NMC 811. FIG. 4H is a SEM-EDS line scan of Up-NMC 811.

DETAILED DESCRIPTION

Figure 1:
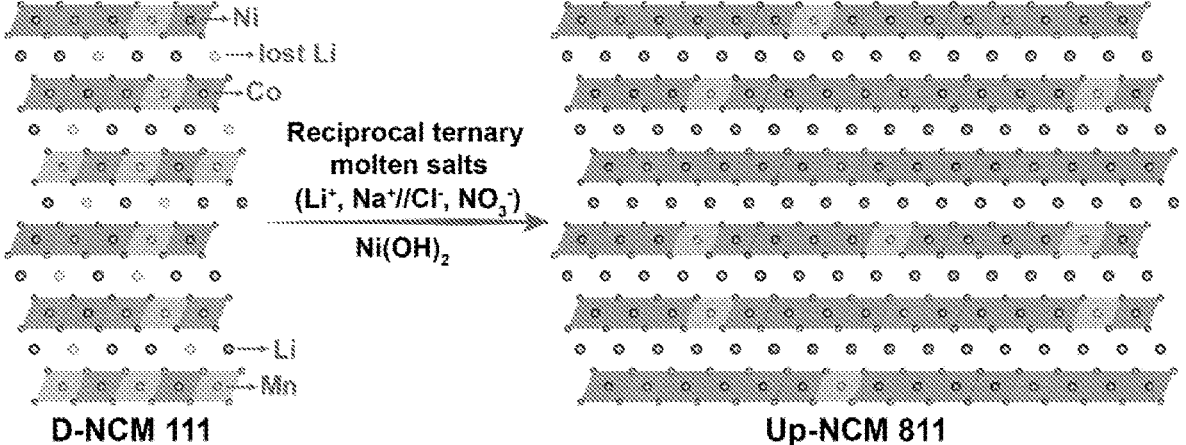
FIG. 1. Schematic illustration of the upcycling of D-NMC 111 to Up-NMC 622 in molten salt.

The present disclosure is foremost directed to a facile method for processing lithium-depleted (i.e., delithiated) nickel-based cathode material obtained from spent lithium-based batteries. The term "processing," as used herein, includes at least relithiating the spent cathode material. If the spent cathode material is relithiated without increasing the nickel content, the process is considered a recycling process. If the spent cathode material is relithiated and also raised in nickel content, the process is considered an upcycling process. The term "spent," as used herein, refers to lithium-based batteries in which the cathode has been partially or completely depleted of lithium (i.e., delithiated) and generally undergoes an irreversible structural change due to the lithium loss. Generally, the spent nickel-based cathode material is not depleted in nickel, and thus, nickel need not be restored but can be increased in an upcycling process.

Step (i) of the process entails producing an initial mixture containing the spent nickel-based cathode material and a molten salt system containing cations and anions, wherein the cations are composed of at least lithium cations. In the initial mixture, the spent cathode material typically does not melt with or dissolve into the molten salt system; rather, the spent cathode material is typically suspended in solid form in the molten salt system throughout the process.

In typical embodiments, the initial mixture in step (i) of the process is produced by first mixing a powder of the spent cathode material with a salt in powder form containing one or more salts to be included in the molten salt system to produce a precursor powder mixture, followed by heating the precursor powder mixture to melt the salt powder into a molten salt system in the presence of the spent cathode material to produce the initial mixture. Depending on the temperature employed to initially melt the salt powder, the heating involved in melting the salt powder in the presence of the spent cathode material may function to only melt the salt powder to produce a molten salt system without a substantial degree of relithiation or optional nickel incorporation of the cathode material, while a subsequent heating step is relied upon to achieve a substantial degree of relithiation and optional nickel incorporation. Alternatively, the initial mixture in step (i) of the process is produced by combining a powder of the spent cathode material with a solid piece of salt, followed by heating the solid piece of salt in the presence of the spent cathode material powder to produce the initial mixture. Alternatively, the initial mixture in step (i) of the process is produced by first melting the salt, not in the presence of the spent cathode material, followed by adding a powder of the spent cathode material into the molten salt system, and mixing the powder of spent cathode material into the molten salt system.

The spent cathode (positive electrode) material can be obtained from any type of lithium-based battery in which the cathode is spent (delithiated). In some embodiments, the lithium-based battery is a lithium metal (plate) battery in which the anode contains a film of lithium metal. The lithium metal battery may contain any of the components typically found in a lithium metal battery, such as described in, for example, X. Zhang et al., *Chem. Soc. Rev.,* 49, 3040-3071, 2020; P. Shi et al., *Adv. Mater. Technol.,* 5(1), 1900806 (1-15), January 2020; and X.-B. Cheng et al., *Chem. Rev.,* 117, 15, 10403-10473 (2017), the contents of which are incorporated herein by reference. In some embodiments, the lithium metal battery contains molybdenum disulfide in the cathode. The lithium metal battery may be a single-use (primary) or rechargeable (secondary) battery. In other embodiments, the lithium-based battery is a lithium-ion battery in which the anode contains lithium ions stored in a base material (e.g., lithium ions intercalated in graphite). The lithium-ion battery may contain any of the components typically found in a lithium-ion battery, including positive (cathode) and negative (anode) electrodes, current collecting plates, a battery shell, such as described in, for example, U.S. Pat. Nos. 8,252,438, 7,205,073, and 7,425,388, the contents of which are incorporated herein by reference in their entirety. In some embodiments, the lithium-ion battery is more specifically a lithium-sulfur battery, as well known in the art, e.g., L. Wang et al., *Energy Environ. Sci.,* 8, 1551-1558, 2015, the contents of which are herein incorporated by reference. The lithium-ion battery may also be a single-use (primary) or rechargeable (secondary) battery. In some embodiments, any one or more of the above specific components may be excluded from the battery.

The nickel-based cathode material being processed can have any of the compositions well known in the art, except that the composition is at least partially depleted in lithium. The cathode typically has an oxide composition containing Ni and at least one of Co, Fe, Mn, Al, Zr, Ti, Nb, or combination of any two or more of these elements, aside from Li, if present. In some embodiments, the cathode material contains at least lithium and nickel in oxide form. In some embodiments, the cathode material contains at least Ni and Co, aside from Li. In other embodiments, the cathode material contains at least Ni and Mn, aside from Li. In other embodiments, the cathode material contains at least Ni, Mn, and Co, aside from Li. To improve conductivity at the cathode, conductive carbon material (e.g., carbon black, carbon fiber, or graphite) may be in admixture with the cathode electrode material.

In some embodiments, the cathode material has a lithium metal oxide composition containing at least lithium, nickel, cobalt, and oxide. Some examples of such cathode materials include $LiNiCoO_2$, $LiNiCoAlO_2$, and $LiNi_xMn_{2-x}O_4$ compositions, or more specifically, $LiNi_{0.5}Mn_{1.5}O_4$, which is particularly suitable as a 5.0 V cathode material, wherein x is a number greater than 0 and less than 2. In some embodiments, one or more additional elements may substitute a portion of the Ni or Mn. In some embodiments, one or more additional elements may substitute a portion of the Ni or Mn, as in $LiNi_xCo_{1-x}PO_4$, and $LiCu_xMn_{2-x}O_4$, materials (Cresce, A. V., et al., *Journal of the Electrochemical Society*, 2011, 158, A337-A342).

In some embodiments, the spent cathode material has a composition containing at least lithium, nickel, manganese, and cobalt, in oxide form. Such compositions are typically referred to as NMC compositions. The composition typically has the formula $LiNi_xMn_yCo_zO_2$, wherein x+y+z=1, and each of x, y, z>0. In some embodiments, x, y, and z are each in a range of 0.2-0.5, or x may be precisely or at least 0.5, 0.55, 0.6, 0.65, 0.7, 0.75, or 0.8 or within a range bounded by any two of these values. Some examples of NMC compositions include $LiNi_{1/3}Mn_{1/3}Co_{1/3}O_2$ (i.e., LiN-iMnCoO_2 or NMC 111), $LiNi_{0.5}Mn_{0.3}Co_{0.2}O_2$ (NMC 532), $LiNi_{0.8}Mn_{0.1}Co_{0.1}O_2$ (NMC 811), and $LiNi_{0.6}Mn_{0.2}Co_{0.2}O_2$ (NMC 622). The cathode may alternatively have a layered-spinel integrated $Li[Ni_{1/3}Mn_{2/3}]O_2$ composition, as described in, for example, Nayak et al., *Chem. Mater.*, 2015, 27 (7), pp. 2600-2611.

In other embodiments, the spent cathode material may have a composition containing at least lithium, nickel, cobalt, and aluminum, in oxide form. Such compositions are typically referred to as NCA compositions. NCA compositions typically have the formula $LiNi_xCo_yAl_zO_2$, wherein x+y+z=1, and each of x, y, z>0. In some embodiments, x is precisely or about 0.6, 0.7, 0.8, or 0.9, such as in the composition $LiNi_{0.84}Co_{0.12}Al_{0.04}O_2$. In some embodiments, an NCA composition is mixed with an NMC composition.

In some embodiments, the molten salt is composed of solely one or more lithium salts, wherein the lithium salt is composed of lithium cations and one or more types of anions. The anion(s) may be one or more of, for example, halide (e.g., chloride or bromide), nitrate, carbonate, sulfate, hydroxide, or oxide. Thus, the lithium salt may be, for example, a lithium halide (e.g., lithium chloride or lithium bromide), lithium nitrate, lithium carbonate, lithium sulfate, lithium hydroxide, or lithium oxide, or a combination of any two or more of the foregoing lithium salts. In some embodiments, the molten salt includes or is strictly limited to the lithium salt and one or more other alkali metal salts (e.g., a sodium or potassium salt). For example, the molten salt may include a lithium halide (e.g., LiCl) and at least one of a sodium salt, potassium salt, rubidium salt, and/or cesium salt (i.e., NaX, KX, RbX, and/or CsX, wherein X is, e.g., Cl, Br, I, OH, nitrate, carbonate, or sulfate). When the molten salt does not also include a nickel salt, the process is a relithiation (recycling) process but not an upcycling process.

In some embodiments, the molten salt contains one or more lithium salts and one or more nickel salts, in which case the molten salt contains at least or solely lithium and nickel cations and one or more types of anions, such as any of the anions described above. When the molten salt includes a nickel salt, the process can be considered an upcycling process because the product will be a cathode material containing a greater amount of nickel. The lithium salt may be, for example, any of the lithium salts exemplified above. The nickel salt may be, for example, a nickel halide (e.g., $NiCl_2$), nickel nitrate ($Ni(NO_3)_2$), nickel carbonate, nickel sulfate, nickel hydroxide, or nickel oxide, or a combination of any two or more of the foregoing nickel salts. When a nickel salt (other than nickel hydroxide or oxide) is included, the molten salt also preferably includes a metal hydroxide, such as an alkali hydroxide or alkaline earth hydroxide. The metal hydroxide may more specifically be NaOH or KOH. In some embodiments, the cations comprise nickel and lithium cations and the anions comprise chloride or bromide anion in combination with at least one of nitrate, sulfate, and carbonate anions in further combination with hydroxide anion. In some embodiments, the anion includes or is strictly limited to halide, nitrate and hydroxide. In further or separate embodiments, the anions include or are strictly limited to chloride or bromide anion in combination with nitrate anions in further combination with hydroxide anions. In further or separate embodiments, the cations include or are strictly limited to nickel, lithium, and at least one other alkali metal cation selected from sodium, potassium, rubidium, and cesium cations. In some embodiments, the molten salt is made by mixing nickel nitrate with lithium chloride followed by heating to produce the molten salt.

In some embodiments, before step (i), the spent cathode material is ground into a powder form. Methods for grinding metals and metal oxide materials into a fine powder form are well known in the art. The powder of spent cathode material typically has a maximum average particle size of 100, 200, or 500 microns. In some embodiments, the powder of spent cathode material has an average or substantially uniform particle size of, for example, 1, 2, 5, 10, 20, 50, 100, 200, or 500 microns, or a particle size within a range bounded by any two of the foregoing values (e.g., 1-500 microns, 1-200 microns, 50-500 microns, or 50-200 microns). In some embodiments, any of the foregoing average particle sizes may instead be a maximum particle size (e.g., a particle size of up to 100, 200, or 500 microns).

In some embodiments, to produce the initial mixture in step (i), a precursor powder mixture containing the spent cathode material (in powder form) and a salt system in powder form (functioning as precursor to molten salt system) is subjected to a temperature and time sufficient to melt the salt system, such as a temperature of 250° C. to 400° C. for at least 1, 2, 3, 4, 5, or 6 hours. The melting temperature may be, for example, 250° C., 275° C., 300° C., 325° C., 350° C., 375° C., or 400° C., or a melting temperature within a range bounded by any two of the foregoing temperatures (e.g., 250° C.-400° C., 300° C.-400° C., 350° C.-400° C., or 350° C.-400° C.). In some embodiments, the precursor powder mixture is raised from a lower temperature (e.g., room temperature) to the melting temperature of 250° C.-400° C. gradually at a temperature ramp rate of 1° C./min to 10° C./min. In different embodiments, the temperature ramp rate is 1° C./min, 2° C./min, 5° C./min, or 10° C./min.

In step (ii) of the process, the initial mixture of spent cathode material and molten salt system is heated to result in at least relithiation of the spent cathode material. If the molten salt contains nickel, the initial mixture is heated to further result in nickel incorporation for upcycling of the cathode material. The initial mixture is typically heated to a temperature of at least 700° C. and up to 900° C. to result in relithiation of (and optional nickel incorporation into) the spent cathode material. In different embodiments, the initial mixture is heated to a processing temperature of precisely or about, for example, 700° C., 725° C., 750° C., 775° C., 800° C., 825° C., 850° C., 875° C., or 900° C., or a processing temperature within a range bounded by any two of the foregoing temperatures (e.g., 700° C.-900° C., 725° C.-900°

C., 750° C.-900° C., 775° C.-900° C., 800° C.-900° C., 850° C.-900° C., 700° C.-850° C., 725° C.-850° C., 750° C.-850° C., 775° C.-850° C., or 800° C.-850° C.). The initial mixture is heated at any of the above processing temperatures for a suitable period of time that results in at least relithiation of (and optional nickel incorporation into) the spent cathode material. The period of time at which the initial mixture resides at any of the above processing temperatures may be about or at least, for example, 1, 2, 3, 4, 5, 6, 7, 8, 12, 16, 20, 24, 28, 32, or 36 hours, or an amount of time within a range bounded by any two of the foregoing values (e.g., 4-12, 4-8, or 4-6 hours).

In some embodiments, the initial mixture is gradually elevated in temperature over a period of time (e.g., 10, 20, 30, 60, or 90 minutes) up to any of the foregoing processing temperatures, followed by maintaining the initial mixture at any of the foregoing processing temperatures for any of the above periods of time. The end result of step (ii) is production of a final mixture containing relithiated cathode material and residual salt. In the event that an excess amount of lithium salt and/or nickel salt is used in the initial mixture in step (i), the final mixture (relithiated cathode material) may also include a remaining amount of lithium salt and/or nickel, although in a lower concentration than in the initial mixture. In some embodiments, the initial mixture is raised from a lower temperature (e.g., a molten salt temperature of 250-400° C.) to the temperature of 700° C.-900° C. gradually at a temperature ramp rate of 1° C./min to 10° C./min. In different embodiments, the temperature ramp rate is 1° C./min, 2° C./min, 5° C./min, or 10° C./min. In other embodiments, a precursor powder mixture containing the spent cathode material and salt system, all in powder form, is raised in temperature from room temperature (typically, 18-30° C., or about 25° C.) to a temperature of 250-400° C. to first melt the salt system to form the initial mixture, followed by further heating of the initial mixture to at least relithiate the spent cathode material.

In some embodiments, a precursor powder mixture containing the spent cathode material and salt system, all in powder form, is gradually increased in temperature from room temperature to melting temperature, such as by any of the temperature ramp rates provided above. In further or separate embodiments, the initial mixture, which contains the spent cathode material suspended in molten salt, is gradually increased in temperature from the melting (molten) temperature to relithiation temperature, such as by any of the temperature ramp rates provided above. In some embodiments, steps (i) and (ii) are practiced as distinct steps, such as by heating to first form the initial (molten) mixture, residing for a period of time at the molten temperature, followed by further heating to reach the relithiation temperature. However, in other embodiments, the temperature is gradually increased from room temperature to the melted state (to form the initial mixture) and on to the relithiation temperature on a gradual and consistent basis, in which case steps (i) and (ii) are combined since there is no clear separation between steps (i) and (ii).

After heating the initial mixture to produce the relithiated cathode material, the relithiated cathode material is washed to remove any residual (remaining) salt, typically at least lithium salt and/or nickel salt. The foregoing step may be referred to as step (iii). The remaining salt is typically removed by washing the relithiated cathode material with a solvent in which remaining salts are substantially soluble. The solvent is generally highly polar to ensure substantial absorption of remaining salt. The solvent may be a single solvent or a mixture of solvents. The solvent should not be reactive with the cathode material while capable of dissolving remaining salt. To make subsequent drying easier, the solvent preferably has a boiling point of no more than or less than 120° C. or 100° C. The solvent may be, for example, water, methanol, acetone, acetonitrile, NMP, or DMF, or mixtures (particularly aqueous mixtures) thereof. As indicated above, following the washing step, the washed relithiated cathode material is typically dried, which may be referred to as step (iv). The washed relithiated cathode material may be dried by, for example, allowing the cathode material to reside at room temperature or an elevated temperature (e.g., 80° C., 100° C., 120° C., or 150° C.) at ambient pressure or a reduced pressure (i.e., less than 1 atm, such as provided by a vacuum oven) for a period of time of, for example, 0.5, 1, 2, 3, 4, 5, 6, 12, 18, or 24 hours. In some embodiments, following a washing and/or drying step, the relithiated cathode material is heated (e.g., calcined), typically at a temperature above 200° C., more typically at a temperature of precisely, about, or at least 300° C., 350° C., 400° C., 450° C., 500° C., 550° C., 600° C., 650° C., 700° C., 750° C., 800° C., 850° C., or 900° C., or a temperature within a range bounded by any two of the foregoing temperatures (e.g., 300-900° C., 400-900° C., 500-900° C., 300-800° C., 400-800° C., 500-800° C., 300-700° C., 400-700° C., 500-700° C., 300-600° C., or 400-600° C.) for a period of time of at least or about 1, 2, 3, 4, 5, or 6 hours. The foregoing heating step may, in some embodiments, be achieved by gradually heating the relithiated cathode material from a lower temperature to any of the elevated temperatures provided above in a gradual manner according to any of the temperature ramp rates provided earlier above.

The relithiated or upcycled cathode material produced in step (iii) or any step thereafter may then be incorporated into a cathode of a lithium-based battery. The relithiated cathode material may be incorporated into any type of lithium-based battery, such as any of the types of lithium-based batteries described earlier above from which spent cathode material was derived. In accordance with conventional practice, the relithiated or upcycled cathode material may be admixed with an adhesive (e.g., PVDF, PTFE, and co-polymers thereof) in order to be properly molded as an electrode. In some embodiments, the anode (negative) electrode of the battery may be a carbon-based composition in which alkali or other ions can be stored (e.g., intercalated or embedded), such as elemental carbon, or more particularly graphite (e.g., natural or artificial graphite), petroleum coke, carbon fiber (e.g., mesocarbon fibers), or carbon (e.g., mesocarbon) microbeads. The anode may be at least 70 80, 90, or 95 wt % elemental carbon. The anode may alternatively be a metal oxide, such as tin dioxide ($SnO_2$) or titanium dioxide ($TiO_2$), or a composite of carbon and a metal oxide. The anode material may also be admixed with an adhesive (e.g., PVDF, PTFE, and co-polymers thereof) in order to be properly molded as an electrode. Typically, positive and negative current collecting substrates (e.g., Cu or Al foil) are also included. The assembly and manufacture of lithium-based batteries are well known in the art.

Examples have been set forth below for the purpose of illustration and to describe certain specific embodiments of the invention. However, the scope of this invention is not to be in any way limited by the examples set forth herein.

EXAMPLES

Upcycling of Spent NMC 111 Cathodes

A molten salt system is provided herein to simultaneously realize the addition of Ni and relithiation in cathodes, such as spent NMC 111, where molten salts (MS) are those molten salts containing two cation species and two anion species. In one embodiment, cost-effective lithium chloride and nickel nitrate were chosen as Li and Ni sources, respectively. Sodium hydroxide was used to react with nickel nitrate to obtain nickel hydroxide precursor and sodium nitrate for MS. After flux upcycling, the obtained Ni-rich NMC products (named as Up-NMC 622 based on its chemical composition) exhibited pure $\alpha$-NaFeO$_2$ type layered structure, restored Li content, and excellent electrochemical performance, which is almost the same as the pristine NMC 622. A schematic illustration of the upcycling of D-NMC 111 to Up-NMC 622 in molten salt is provided in FIG. 1. The successful upcycling of spent NMC 111 provides a novel flux method to achieve the direct upcycling of spent LIB cathodes to the next-generation cathodes.

Figures 2A, 2B, 2C, 2D, 2E, 2F:
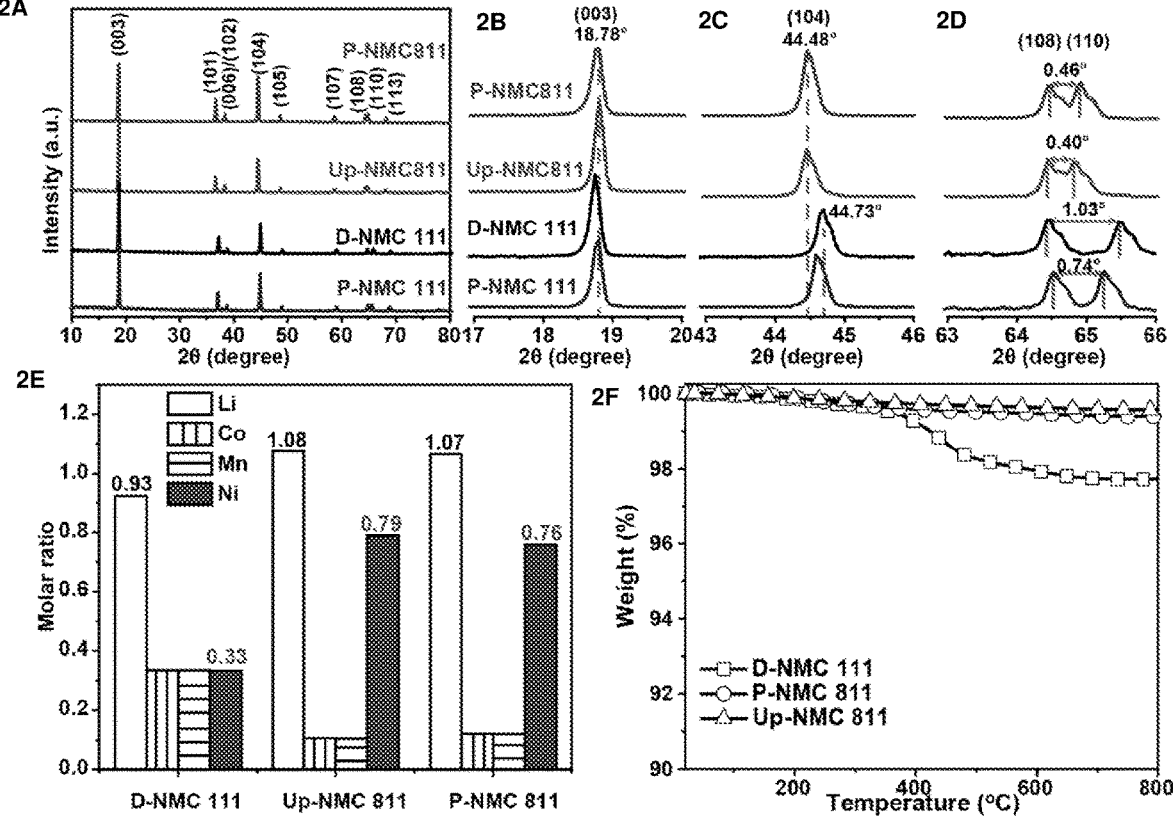
FIGS. 2A-2F.

Similarly, the upcycling of D-NMC 111 to NMC 811 was also tried by the MS flux method using D-NMC 111:Ni (NO$_3$)$_2$·6H$_2$O:LiCl:NaOH under a mass ratio of 1:6.4:2.12: 1.8. After upcycling, the chemical composition of Up-NMC 811 was found to be Li$_{1.08}$Ni$_{0.79}$Co$_{0.11}$Mn$_{0.10}$O$_2$ (FIG. 2E), which almost coincides with that of P-NMC 811 (Li$_{1.07}$Ni$_{0.76}$Co$_{0.12}$Mn$_{0.12}$O$_2$), which suggests the successful upcycling of D-NMC 111. According to XRD patterns (FIG. 2A), both pristine NMC 811 and Up-NMC 811 have the O3-type structure similar to the layered structure of $\alpha$-NaFeO$_2$. P-NMC 811 has a narrow peak splitting between (108) and (110) of 0.46° due to its high Ni content. The XRD patterns of Up-NMC 811 and P-NMC 811 reveal similar features in that their (003) peaks slightly shift to higher angles compared to D-NMC 111 (FIG. 2B), and (104) peak to lower angles (FIG. 2C). The split between (108) and (110) in the XRD pattern of Up-NMC 811 is 0.40° similar to that of P-NMC 811 (FIG. 2D), which suggests a well-layered structure. The TGA curves of Up-NMC 811 and P-NCM 811 almost coincide (FIG. 2F), which indicates their similar thermal stability.

Figure 3:
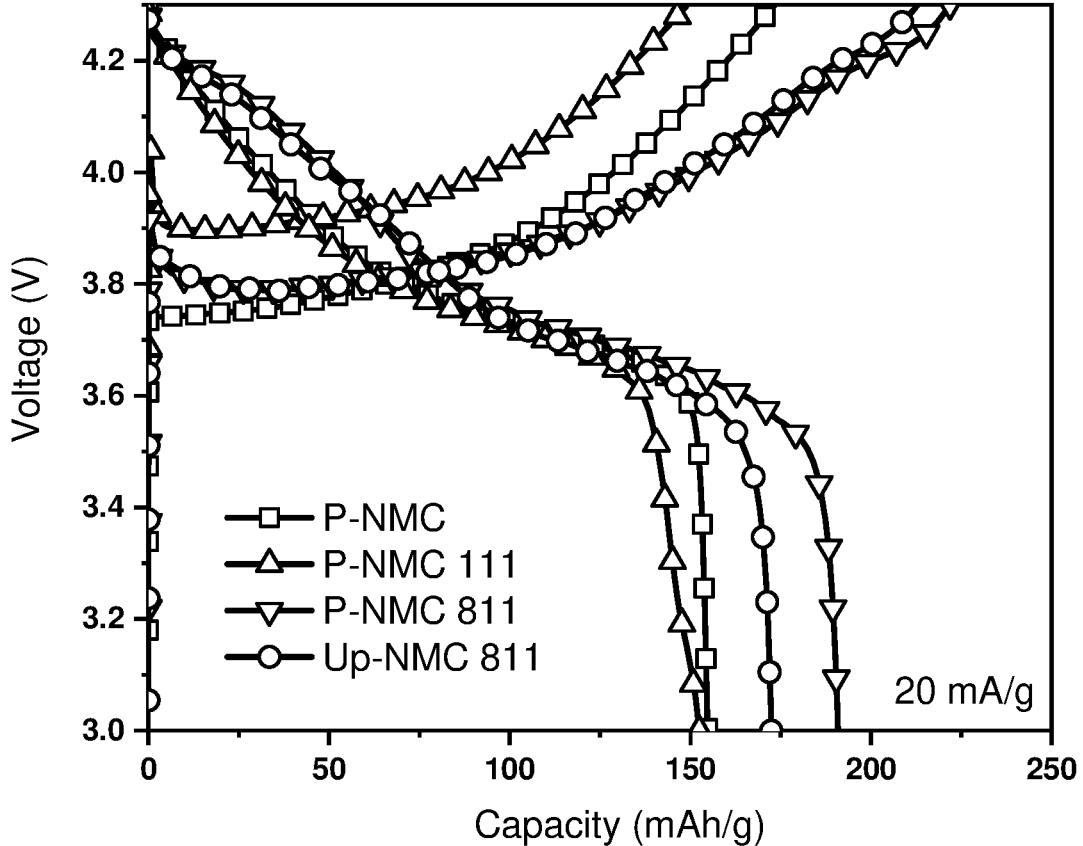
FIG. 3. Graph showing the first cycle charge/discharge curves for half-cell tests for Up-NMC 811, P-NMC 811, D-NMC 111, and P-NMC 111.
Figures 4A, 4B, 4C, 4D, 4E, 4F:
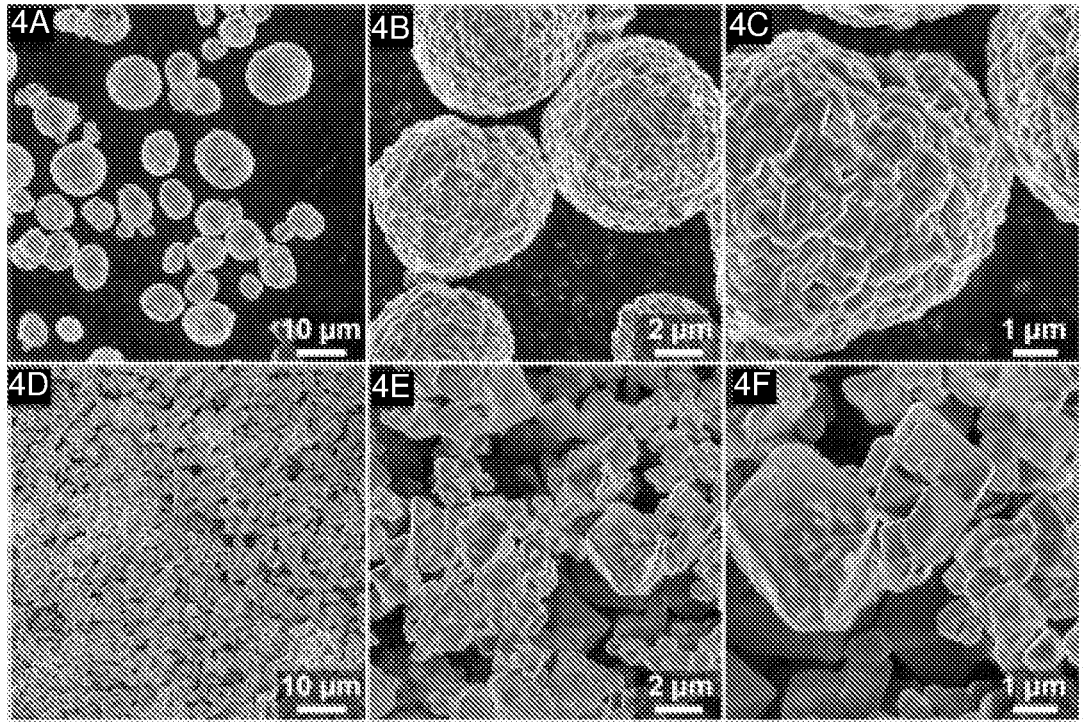
FIGS. 4A-4H.
Figure 4G:
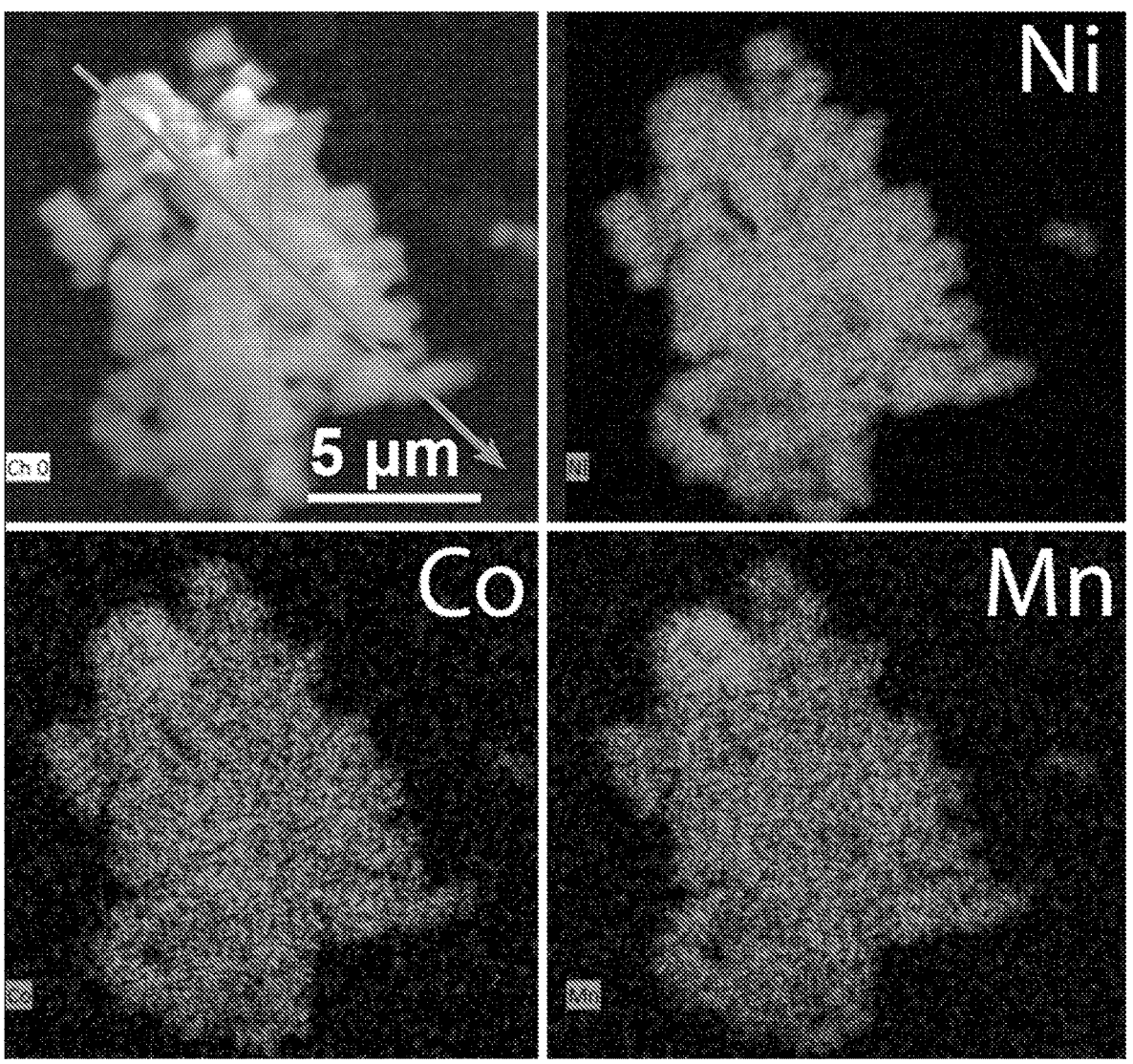
Figure 4H:
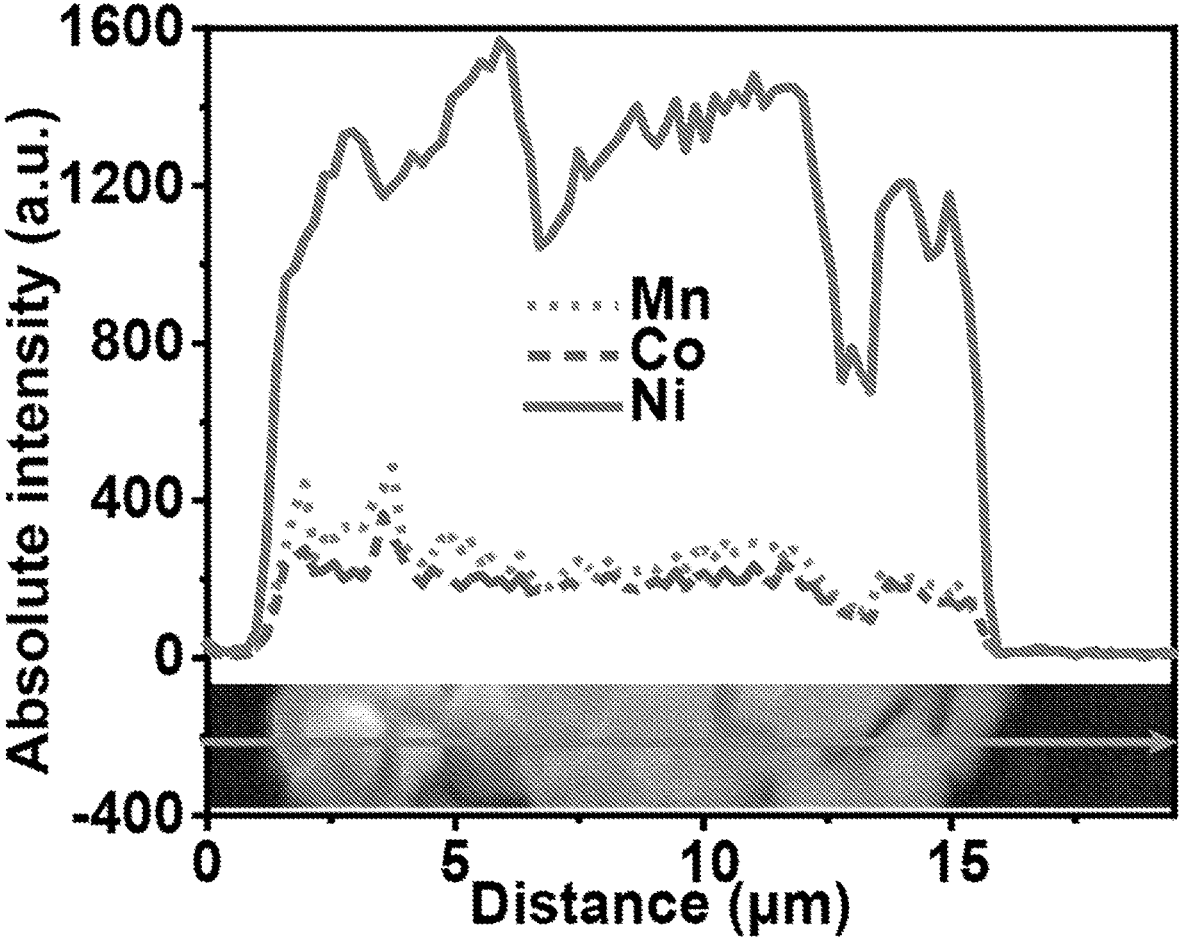

The electrochemical performance of Up-NMC 811 was investigated by half-cell tests, using a specific current density of 20 mA/g in a voltage range of 3-4.3 V. As shown in FIG. 3, the first charge capacity of Up-NMC 811 is as high as 218 mAh/g, almost the same as that of P-NMC 811 (222 mAh/g). However, the coulomb efficiency of Up-NMC 811 is lower than that of P-NMC 811, which results in a low discharge capacity (161 mAh/g). Although Up-NMC 811 is not as good as P-NMC 811 in battery performance, Up-NMC 811 still has upgraded charge-discharge capacities compared to P-NMC 111 and D-NMC 111. The low coulomb efficiency of Up-NMC 811 may be due to its large grain size (FIGS. 4D-4F). Up-NMC 811 does not reveal the typical secondary particles like P-NMC 811 in SEM images (FIGS. 4A-4F), which indicates the dissolution of D-NMC 111 in RTMS during the upcycling process. The SEM-EDS line scan (FIG. 4H) and element mapping (FIG. 4G) confirm the uniform distribution of Ni, Co, and Mn in Up-NMC 811. Based on the above results, the upcycling of DNMC 111 to Up-NMC 811 are also successful in both chemical composition and crystal structure.

Upcycling Procedures

For the upcycling of D-NMC 111 to Up-NMC 622 in MS system, 1.0 g of D-NMC 111 was mixed with 2.4 g of Ni(NO$_3$)$_2$·6H$_2$O and 0.86 g of LiCl by hand grinding in an agate mortar. After grinding, the mixture became a slurry, to which 1.2 g of NaOH was added and then grinded until a uniform slurry formed. Then the upcycling mixture was dried at 110° C. overnight in a vacuum oven and ground into fine powder before heating in a muffle furnace. The mixture was heated to 300° C. for 5 hours and then to 800° C. for 5 hours at a heating rate of 5° C./min in air. After cooling down to ambient temperature, the mixture was washed with water by vacuum filtration to remove salts, dried at 110° C. overnight in a vacuum oven, and heated to 600° C. for 2 hours at a heating rate of 5° C./min in air to obtain the final product Up-NMC 622.

For control experiments using NaNO$_3$/LiNO$_3$ binary molten salts, LiCl in the upcycling mixture was replaced by equimolar LiNO$_3$. For NaCl/LiCl binary molten salts, Ni(NO$_3$)$_2$·6H$_2$O was replaced by equimolar NiCl$_2$·6H$_2$O. For LiCl/LiNO$_3$ binary molten salts, NaOH was replaced by equimolar LiOH. The drying and heating processes in control experiments were the same as in the MS upcycling processes.

Electrochemical Measurements

An NMC cathode slurry was used that contains NMC, carbon black, and 5 wt % binder polyvinylidene difluoride (PVDF) with a mass ratio of 90:5:5, and appropriate amount of N-methylpyrrolidone (NMP). Cathodes were casted on Al foil at a total loading of around 8.5 mg/cm$^2$. For full cell tests, the anode slurry containing graphite, and carbon black with a mass ratio of 92:6:2, and NMP was coated on Cu foil. All electrodes were dried at 110° C. overnight in a vacuum oven prior to cell assembly. For half-cell tests, Li foil disks were used as anodes. All of the coin cells were assembled in an argon-filled glove box using one layer of Celgard 2325 membrane as the separator and 120 µL of 1.2 M LiPF$_6$ in 3:7 wt % ethylene carbonate/ethyl methylcarbonate as the electrolyte. 10 hours of rest was performed for all coin cells before cycling. All cells were tested under ambient temperature. The voltage windows were 3.0~4.3 V and 3.0~4.2 V vs. Li/Li$^{3+}$ for half-cell and full cell tests, respectively. Four formation cycles were performed at a specific current of 20 mA/g charge/discharge before cycling at 200 mA/g for 100 cycles. Full cells were charged using a CCCV protocol (charged to 4.2 V using a constant specific current of 200 mA/g, then held at 4.2 V until the current dropped to 66 mA/g before discharging).

Inductively coupled-plasma optical emission spectroscopy (ICP-OES) for the elemental analysis was performed on an Agilent 5110 ICP-OES spectrometer. The results are listed in Table 1 below.

TABLE 1

ICP-OES results for NMCs under different upcycling conditions.

| Sample ID/Reaction conditions | Mole ratio | | | |
|---|---|---|---|---|
| | Li | Ni | Co | Mn |
| D-NMC 111 | 0.93 | 0.33 | 0.33 | 0.33 |
| P-NMC 111 | 1.07 | 0.33 | 0.33 | 0.33 |
| P-NMC 622 | 1.05 | 0.62 | 0.19 | 0.20 |
| LiCl/NaCl | 0.63 | 0.60 | 0.20 | 0.20 |
| LiCl/LiNO$_3$ | 0.88 | 0.63 | 0.18 | 0.18 |
| LiNO$_3$/NaNO$_3$ | 1.04 | 0.63 | 0.19 | 0.18 |
| Up-NMC 622 | 1.08 | 0.63 | 0.19 | 0.18 |
| P-NMC 811 | 1.07 | 0.76 | 0.12 | 0.12 |
| Up-NMC 811 | 1.08 | 0.79 | 0.11 | 0.10 |

In summary, the successful upcycling of cathodes, such as D-NMC 111 to Ni-rich NMC cathodes, was achieved under ambient pressure and air atmosphere via a molten salt flux upcycling strategy. The Li$^+$, Na$^+$||Cl$^-$, NO$_3^-$ MS featuring a low melting point can simultaneously provide the Li source, an oxygen-rich environment for the oxidation of Ni$^{2+}$ to Ni$^{3+}$, and an effective flux media under high temperature, which are essential for the successful upcycling. Up-NMC 622 or Up-NMC 811 has nearly identical chemical composition and structure to PNMC 622 or P-NMC 811, whose electrochemical performance as a LiB cathode is better than those of D-NMC 111 and P-NMC 111. This MS upcycling strategy is promising for the upcycling of spent NMC cathodes to next-generation Ni-rich NMC cathodes.

While there have been shown and described what are at present considered the preferred embodiments of the invention, those skilled in the art may make various changes and modifications which remain within the scope of the invention defined by the appended claims.

What is claimed is:

1. A method for processing spent nickel-based cathode material useful in lithium-based batteries, the method comprising: (i) producing an initial mixture containing the spent nickel-based cathode material and a molten salt system comprising cations and anions, wherein the cations comprise lithium and nickel cations, by mixing the spent nickel-based cathode material and a mixture of salt powders comprising lithium and nickel salt powders, to produce a precursor powder mixture, followed by heating the precursor powder mixture at a temperature of 250° C. to 400° C. for at least 1 hour to melt the mixture of salt powders to form the molten salt system in the presence of the spent nickel-based cathode material to produce the initial mixture; (ii) heating the initial mixture to a temperature of 700° C. to 900° C. for at least 1 hour to produce a relithiated cathode material having a greater nickel content than the spent nickel-based cathode material; and (iii) washing the relithiated cathode material to remove any residual salt.

2. The method of claim 1, wherein the spent nickel-based cathode material is spent Ni—Co—Al (NCA) cathode material.

3. The method of claim 1, wherein the anions comprise chloride or bromide anion in combination with nitrate anions in further combination with hydroxide anions.

4. The method of claim 1, wherein, in step (ii), the initial mixture is heated to a temperature of 750° C. to 900° C. for at least 1 hour.

5. The method of claim 1, wherein, in step (ii), the initial mixture is heated to a temperature of 775° C. to 900° C. for at least 1 hour.

6. The method of claim 1, wherein, in step (ii), the initial mixture is heated to a temperature of 750° C. to 900° C. for at least 3 hours.

7. The method of claim 1, wherein, in step (ii), the initial mixture is heated to a temperature of 775° C. to 900° C. for at least 3 hours.

8. The method of claim 1, wherein step (i) the spent nickel-based cathode material is in powder form.

9. The method of claim 1, wherein step (iii) comprises washing the relithiated cathode material with water to remove any residual salt.

10. The method of claim 1, wherein, in step (ii), the initial mixture is raised to said temperature of 700° C. to 900° C. gradually at a temperature ramp rate of 1° C./min to 10° C./min.

11. The method of claim 1, wherein the relithiated cathode material is incorporated into a cathode of a lithium-based battery.

12. The method of claim 1, wherein the method converts spent NCM 111 cathode material to NCM 622 or NCM 811 cathode material.

13. The method of claim 1, wherein the spent nickel-based cathode material is in powder form.

14. The method of claim 13, wherein the powder has a particle size of up to 100 microns.

15. The method of claim 1, wherein the cations comprise nickel and lithium cations and the anions comprise chloride or bromide anion in combination with at least one of nitrate, sulfate, and carbonate anions in further combination with hydroxide anion, wherein the method results in upcycling of the nickel-based cathode material to produce a version of said relithiated cathode material having a greater nickel content.

16. The method of claim 15, wherein the cations comprise nickel, lithium, and at least one other alkali metal cation selected from sodium, potassium, and cesium cations.

17. The method of claim 1, further comprising: (iv) drying the relithiated cathode material after washing.

18. The method of claim 17, further comprising: (v) heating the relithiated cathode material in an oxygen-containing atmosphere to a temperature of 500° C. to 700° C. for at least 1 hour after washing and drying the relithiated cathode material.

19. The method of claim 1, wherein the spent nickel-based cathode material is spent Ni—Mn—Co (NMC) cathode material.

20. The method of claim 19, wherein the spent Ni—Mn—Co (NMC) cathode material is spent NMC-111 cathode material.

21. The method of claim 19, wherein the spent Ni—Mn—Co (NMC) cathode material is spent NMC-622 cathode material.

22. The method of claim 19, wherein the spent Ni—Mn—Co (NMC) cathode material is spent NMC-811 cathode material.

* * * * *